United States Patent [19]

Herring

[11] 4,252,082
[45] Feb. 24, 1981

[54] SLOTTED FLOOR SECTION WITH BUILT-IN MEANS ADAPTED FOR CONCURRENTLY HEATING LITTER AND COOLING SOW IN FARROWING HOUSE

[76] Inventor: William T. Herring, P.O. Box 181, Newton Grove, N.C. 28366

[21] Appl. No.: 50,067

[22] Filed: Jun. 19, 1979

[51] Int. Cl.³ .......................... A01K 1/00; A01K 1/02
[52] U.S. Cl. .......................................... 119/20; 119/28
[58] Field of Search .............................. 119/28, 20, 16

[56] References Cited

U.S. PATENT DOCUMENTS

| | | | |
|---|---|---|---|
| 3,181,503 | 5/1965 | Tripp | 119/20 |
| 3,677,229 | 7/1972 | Blough et al. | 119/16 |
| 3,905,334 | 9/1975 | Stevenson | 119/20 |

Primary Examiner—Hugh R. Chamblee
Attorney, Agent, or Firm—Bell, Seltzer, Park & Gibson

[57] ABSTRACT

Slotted floor sections formed of reinforced concrete and commonly referred to as gang slats, that underlie and serve to support farrowing crates within a farrowing house, are provided with conduit means embeddedly built in the gang slats for circulation of a heated fluid through side sections of the gang slat for maintaining surfaces of the side sections in a warm condition conductive to promoting a healthy litter of newborn pigs, and wherein additional conduit means are embeddedly built in a central section of the gang slat so as to concurrently aid in maintaining surfaces of the central section in a cool condition conducive to the health of the sow.

28 Claims, 10 Drawing Figures

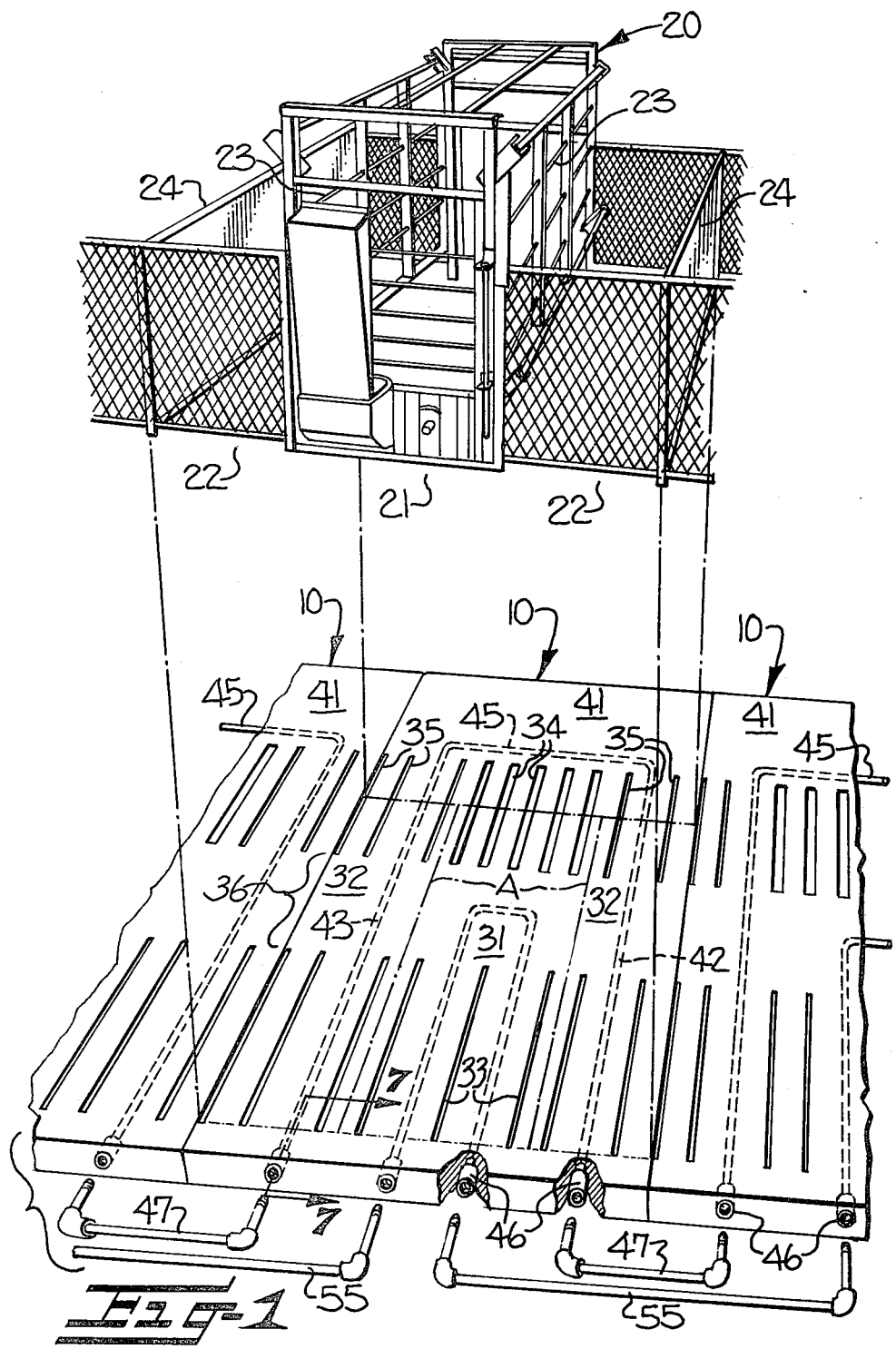

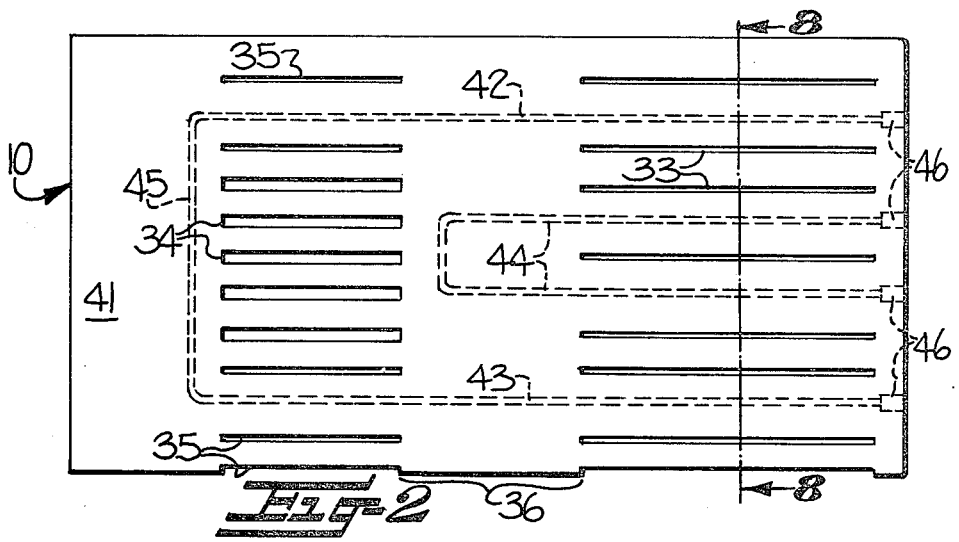
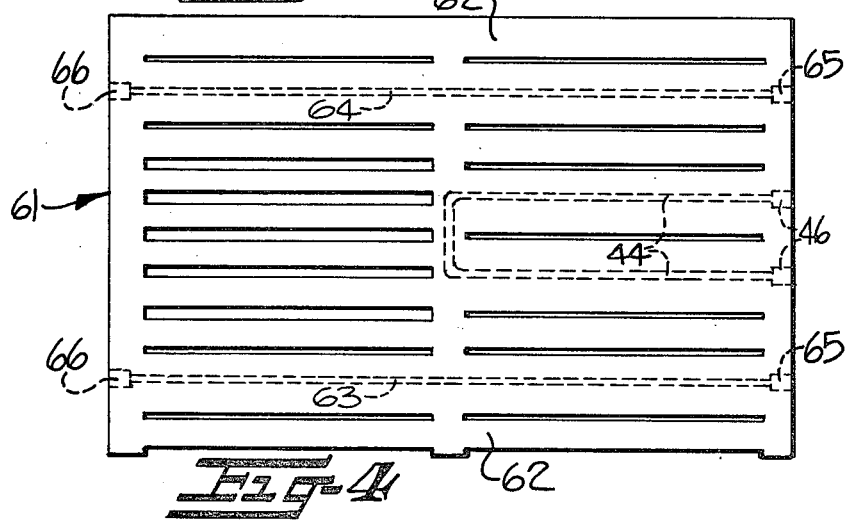

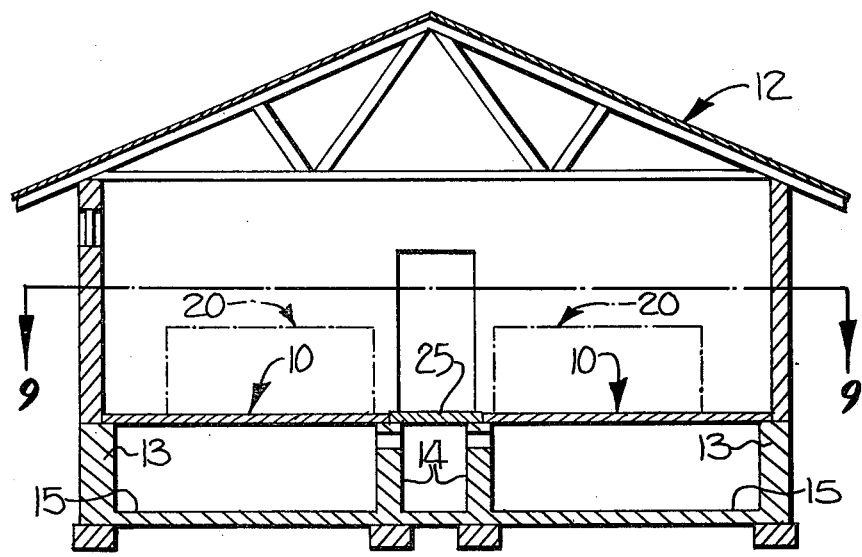
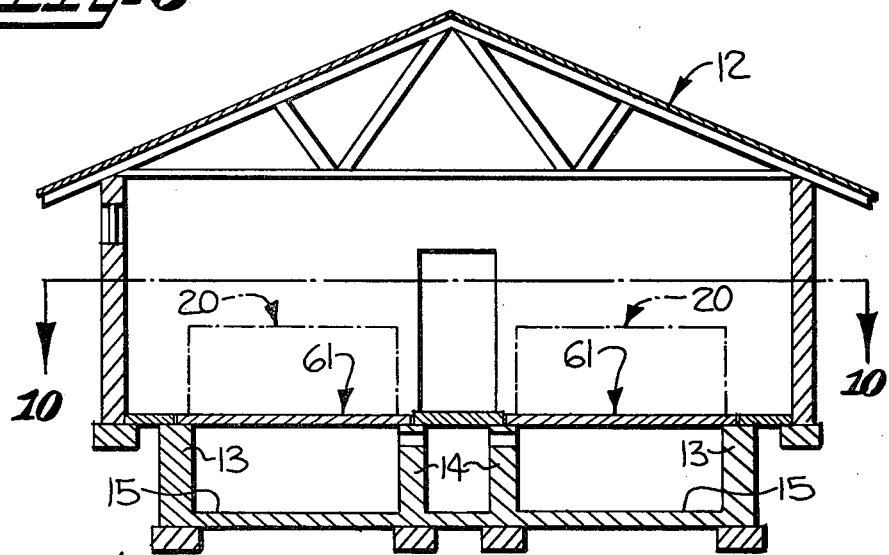
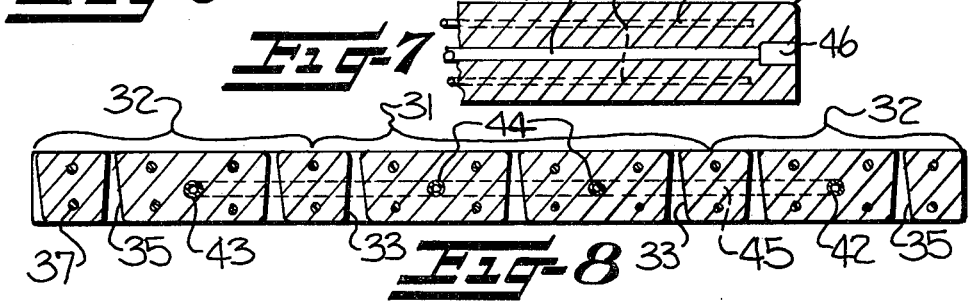

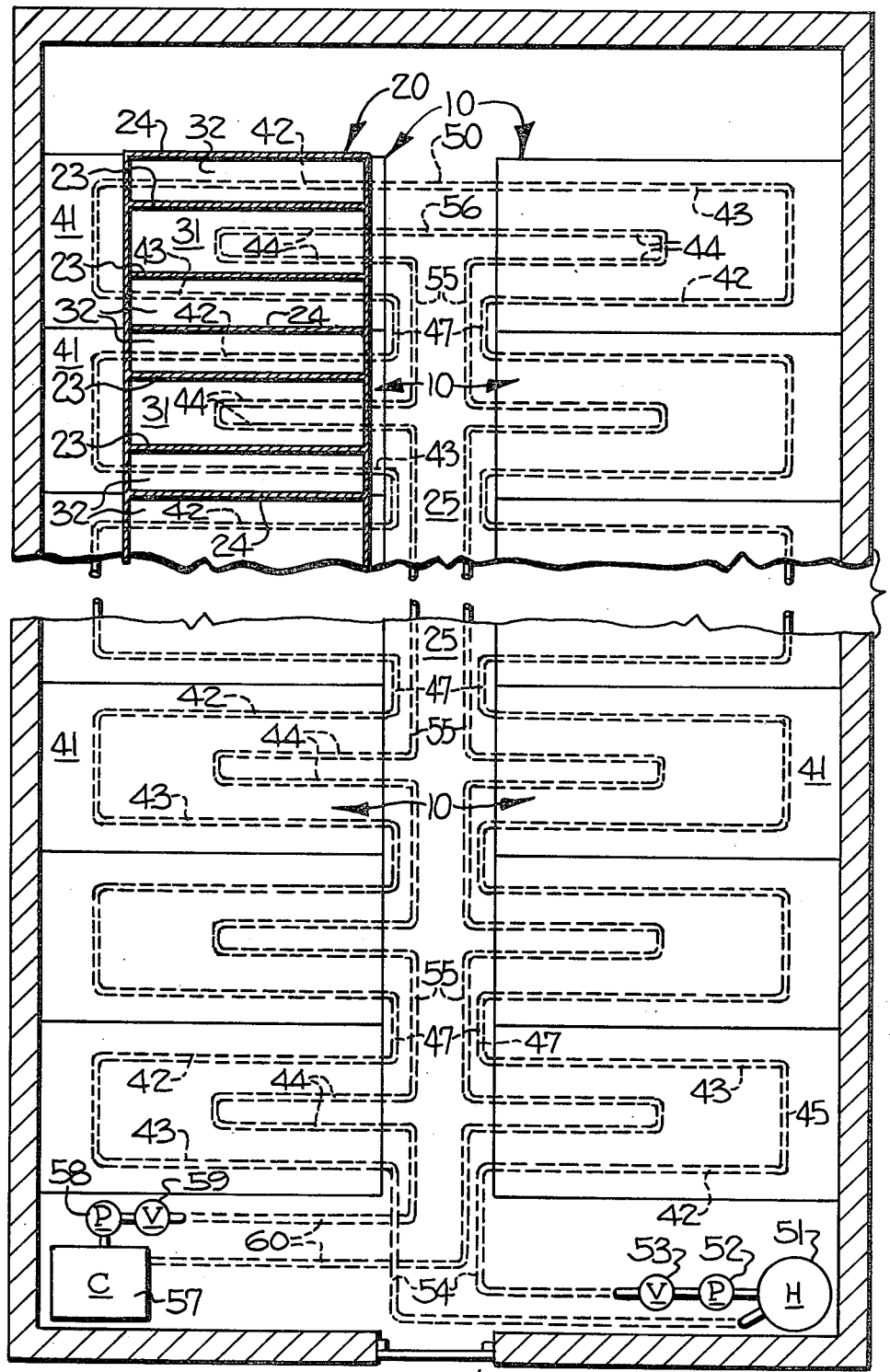

SLOTTED FLOOR SECTION WITH BUILT-IN MEANS ADAPTED FOR CONCURRENTLY HEATING LITTER AND COOLING SOW IN FARROWING HOUSE

FIELD OF THE INVENTION

The present invention relates to flooring for animal shelters such as farrowing houses or farrowing facilities, and more particularly concerns slotted floor sections with built-in means for heating only the litter of pigs and for cooling only the sows. Specifically, the invention concerns slotted reinforced concrete floor sections, which are commonly referred to as gang slats, that underlie and serve to support farrowing crates within a farrowing house. Each gang slat includes means for heating the sections of the gang slat that are particularly accommodated for containment of the litter while avoiding applying heat to the sow, and means for cooling the section of the gang slat that is particularly adapted for confinement of the sow while avoiding cooling the litter.

BACKGROUND OF THE INVENTION

As the swine production industry has evolved from the status of a supplement to farm income to that of a major enterprise with production in intensified units, modern confinement facilities for the hogs and pigs have been developed. These facilities require the application of increasingly refined principles of breeding, nutrition, physiology, and environmental control so that the hogs can be developed to economically produce the maximum quality products. With respect to swine management, the primary object is to minimize environmental factors which are adverse to the swine so as to provide maximum opportunity for survival and growth.

Particularly during farrowing, a large number of pigs in the litter fail to survive for finishing or breeding as a result of crushing by the sow, infections, or starvation. Thus, climatically controlled farrowing houses or facilities with specially adapted farrowing pens have been employed to minimize the losses from the litter. Typically, the sow is confined within a central pen portion of the farrowing pen or crate, which is only large enough to permit her to recline on her side. Side pens of the farrowing crate adjacent each side of the central pen accommodate the litter, and a divider forming the adjacent sides of the central and side pens prevents the sow from entering the side pens and injuring the litter. The pigs in the litter, however, can obtain access to the sow for feeding by passing under the divider, and thereby, the pigs can move to either side of the sow as is required.

In the usual arrangement for an animal shelter of this farrowing house type, two rows of pens are provided along the length of the shelter, with the pens placed in a side-by-side arrangement adjacent each other. A center aisle between the rows provides access to the pens, and side aisles at the rear of the pens can also be included. The flooring of the shelter, which supports the pens and animals, is typically raised above the ground surface so as to form a pit beneath the flooring. Furthermore, the flooring is usually slotted to permit passage of the animals' waste through to the pit below. The slotted floors not only reduce or practically eliminate floor cleaning, but also greatly retard the spread of disease and parasites by allowing the rapid removal of excrement from the pens. Additionally, the slotted floor is an essential component in controlling the atmospheric environment of the farrowing house, in that air is circulated downwardly through the slots to control the temperature and diffusion of odors.

The survival and development of both the litter and sow within a confinement facility of this type is dependent on proper control of ambient temperatures within the facility. A newborn pig is dependent on supplemental heat from the environment since it is incapable of maintaining its own body temperature. On the other hand, sows must be protected from exposure to high temperatures, since they have very limited ability to dissipate body heat by sweating. Typically, it is desirable to maintain a temperature of 80° F. for newborn pigs, while the surrounding temperature for the sow is preferably maintained at 65° F. Thus, any supplemental heat provided for the litter can adversely affect the sow if exposure to the heat occurs. Similarly, if the sow is cooled in order to promote the health of the sow, exposure of the litter to the cooler temperatures could endanger the survival of the newborn pigs.

Prior methods of supplying supplemental heat for the litter have incorporated independent heating systems that direct radiant or convective heat toward the litter. Thus, in some facilities, heat lamps are positioned above the litter or pen in which the litter is contained. The inefficiency or radiant and convective heat supplied in this manner diminishes the economy of production. Furthermore, supplemental heat provided in this manner is not easily controlled to maintain the desirable temperature, and inadvertent heating of the sows cannot always be avoided.

Other methods of supplying supplemental heat to the litter have incorporated systems for heating the entire farrowing house. As shown in U.S. Patent to Jones et al. U.S. Pat. No. 4,018,271, U.S. Patent to Jones et al., U.S. Pat. No. 3,826,230, U.S. Patent to Becker, U.S. Pat. No. 3,815,550, and U.S. Patent to Jones et al. U.S. Pat. No. 3,809,014, these heating systems adapt the flooring of the facility for circulation of a heated fluid through the flooring whereby heat is supplied by conduction and radiation. In a typical construction there is provided a slotted floor composed of individual slats positioned in a parallel spaced arrangement and supported at their opposite ends. The slats, which have been formed from precast concrete, aluminum, and thermoplastic materials, include conduits that are embedded within each individual slat for circulation of a heated fluid through the slat. The conduits are interconnected to form a continuous system, and thereby to complete surface of the flooring is heated as heat is conducted from the fluid. These systems do not allow selective heating of the litter alone, and detrimental heating of the sow cannot be avoided.

Heretofore, the provision of a moderate temperature for the sow has either been neglected or provided by cooling the entire farrowing house when inside temperatures regularly exceeded extremely warm conditions. One method for cooling the facility was to circulate air through pens, and toward that end, the slotted floors allowed circulation of air around the pigs and down through the floor. In another method as illustrated in the above-noted patent to Jones et al., U.S. Pat. No. 4,018,271, flooring systems for animal shelters were developed whereby a coolant could be circulated through the flooring to reduce the temperatures within the facility. These systems were therefore limited to either heating or cooling, and the sow and litter would necessarily be maintained at the same temperature. Simultaneous heating of the litter and cooling of the sow was not possible, so that the preferred temperatures could not be provided.

Furthermore, construction of the flooring for farrowing houses or facilities has been substantially simplified in recent years with the development of floor sections containing a plurality of slats and which are integrally formed by casting reinforced concrete. A representative product of this type is shown in U.S. Patent to Stevenson, U.S. Pat. No. 3,905,334. These integral floor sections are commonly referred to as gang slats. The gang slats are supported at opposite ends on the peripheral and center walls of the farrowing house in a manner similar to the installation of the individual slats, but there is an additional advantage in that installation is convenient. So far as can be determined, no one has heretofore provided any type of built-in heating or cooling means with gang slats and with which this invention is particularly concerned.

SUMMARY OF THE INVENTION

It is accordingly an object of the present invention to provide a slotted floor section for farrowing houses having built-in means adapted for concurrently heating the litter of newborn pigs and cooling the sow as to promote their health and development.

Another object of the present invention is to provide a farrowing house or facility for sows and newborn pigs which includes a flooring system that is adapted to maintain sections of the flooring in a warm condition for heating the litter while avoiding applying heat to the sow and to concurrently maintain other sections of the flooring in a cool condition for cooling the sow while avoiding cooling the litter. In this connection, it is also an object of this invention to provide an integral, reinforced concrete floor section for farrowing crates or pens which are contained within the farrowing house, the floor sections being adapted for circulation of a heated fluid within the portions of the floor section underlying the litter and not within the portions of the floor section underlying the sow. Similarly, it is also an object to provide floor sections adapted for circulation of a coolant within the portions of the floor section underlying the sow and not within the portions of the floor section underlying the litter.

It is a further object of the invention to provide an integral gang slat for underlying and supporting a farrowing crate or pen of the type which includes a pen for the sow and pens for the litter, and wherein the gang slat is adapted for circulation of a heated fluid under only the pens for the litter and for circulation of a coolant under only the pen for the sow.

A further object of the present invention is to provide a flooring system for a farrowing house or facility that is adapted to maintain in a warm condition sections of the flooring underlying selected pens for confining the litter. Accordingly, it is an object of the invention to provide two systems for circulation of a heated fluid through two separate series of interconnected sections of gang slats underlying the pens containing the litter.

Another object of the present invention is to provide a farrowing house for sows and newborn pigs which includes floor sections or gang slats adapted to maintain surfaces of the central sections in a cool condition conducive to the health of the sow while avoiding cooling the litter.

These and other objects and advantages of the present invention are achieved in the embodiments illustrated herein by the provision of an animal shelter for newborn pigs, wherein there is provided a plurality of farrowing crate arranged in opposing rows. Each farrowing crate includes a central pen for confining a sow and side pens extending along opposite sides of the central pen for confining a newborn litter of pigs in close proximity to the sow. A center aisle is disposed between the opposing rows of farrowing crates for access to the farrowing crates.

A plurality of slotted floor sections or gang slats are arranged in corresponding rows to underlie and support the farrowing crates. Each gang slat is formed from reinforced concrete and comprises a central section adapted to support the sow in the central pen and side sections formed integrally with and extending along opposite sides of the central section and being adapted to support the litter in the side pens of one of the farrowing crates. The central section of each gang slat includes a plurality of slots through which the sow's waste can pass, and the side sections also include a plurality of slots through which the waste of the litter can pass.

Associated with each of the gang slats is means for circulation of a heated fluid and coolant through the gang slat to aid in maintaining surfaces of the side sections in a warm condition conducive to promoting a healthy litter of newborn pigs and so as to concurrently aid in maintaining surfaces of the central sections in a cool condition conducive to the health of the sow. The means for circulation comprises conduit means embedded within only the side sections of the gang slats and conduit means embedded only within the central sections of the gang slats. Heat exchanger means connected to the conduit means supplies the heated fluid and coolant for circulation through the conduit means. Also, means for respectively transmitting the heated fluid to the conduit means embedded within the side sections and for returning the heated fluid to the heat exchanger means after dissipation of the heat from the fluid and for transmitting the coolant to the conduit means embedded within the central section and for returning the coolant to the heat exchanger means is provided.

BRIEF DESCRIPTION OF THE DRAWINGS

Some of the objects and advantages of the invention having been stated, others will appear as the description proceeds, when taken in connection with the accompanying drawings, in which FIG. 1 is a perspective view of a floor section or gang slat embodying the features of the present invention, and illustrating the positional arrangement of a farrowing crate with respect to the gang slat;

FIG. 2 is a top view of the gang slat shown in FIG. 1;

FIG. 3 is a top view of a second embodiment of the gang slat of the present invention;

FIG. 4 is a top view of a third embodiment of the gang slat of the present invention;

FIG. 5 is a sectional view of a farrowing house or facility containing the gang slat shown in FIG. 1;

FIG. 6 is a sectional view of a farrowing house or facility containing the gang slat shown in FIG. 4;

FIG. 7 is a sectional view of the end of the gang slat and taken substantially along the line 7—7 of FIG. 1;

FIG. 8 is a sectional view of the gang slat and taken substantially along the line 8—8 of FIG. 2;

FIG. 9 is a sectional view of the farrowing house, taken substantially along the line 9—9 of FIG. 5, and illustrating the connection of the conduit means of the gang slats.

DESCRIPTION OF THE ILLUSTRATED EMBODIMENT

Figure 10:
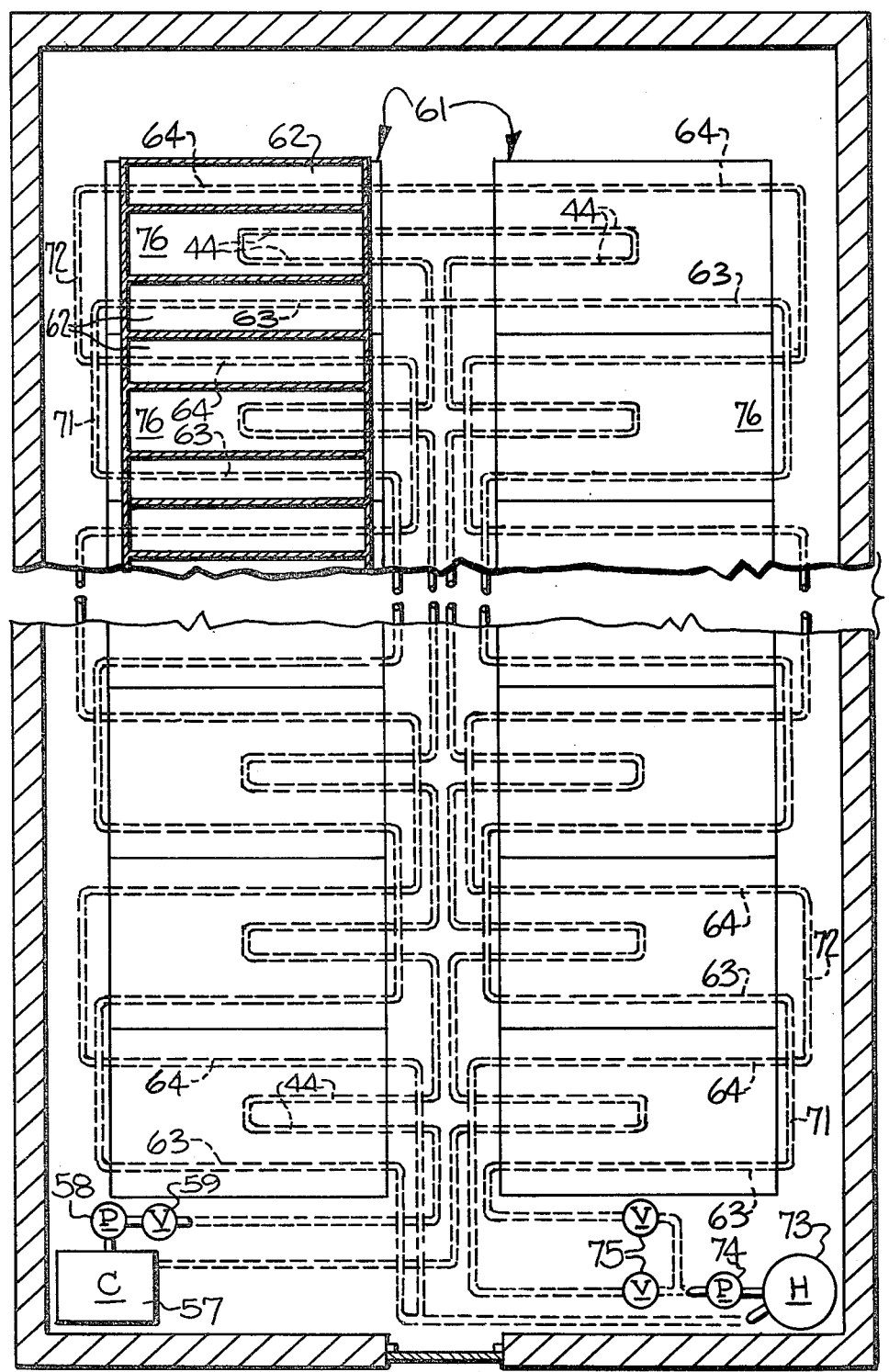
FIG. 10 is a sectional view of the farrowing house illustrated in FIG. 6, taken substantially along the line 10—10, and illustrating the connection of the conduit means of the gang slats.

Referring more specifically to the drawings, the illustrated embodiment of the slotted floor sections, which are commonly referred to as gang slats, is indicated generally at 10, and as shown in FIGS. 5 and 9, the gang slats are adapted for installation in an animal shelter or farrowing house 12 for newborn pigs. The farrowing house 12 is provided with peripheral walls 13 and center walls 14 that extend longitudinally along the length of the farrowing house. The gang slats 10 are supported at their opposite ends by the associated peripheral wall 13 and center wall 14 and are positioned adjacent each other in opposing rows that extend along the length of the farrowing house 12. Thus, pits 15 are formed below the gang slats 10 and between the peripheral walls 13 and center walls 14 for purposes of collection of the pigs' waste as further described below.

The farrowing house 12 also includes a plurality of farrowing crates 20 for confinement of the sow and litter. Each farrowing crate 20 has a central pen 21 wherein the sow is confined, and side pens 22 extend along opposite sides of the central pen to contain the newborn litter of pigs in close proximity to the sow. A divider 23 separates the central pen 21 and the adjacent side pen 22 so that the sow cannot enter the area in which the litter is contained. However, it will be noted that the lower edge of the divider 23 is positioned above the lower edges of the remainder of the crate 20, and thereby the newborn pigs can obtain access to the sow. In addition, since the lower edge of the divider 23 is raised, the pigs in the litter can move from one side pen 22 to the other side pen on the opposite side of the central pen 21 and within the same farrowing crate 20. Thereby, the pigs in the litter have access to either side of the sow according to which side is exposed when the sow lies within the central pen 21.

The farrowing crates 20 are arranged in opposing rows along the length of the farrowing house 12, in a similar manner as the rows of gang slats 10. A fence section 24, preferably of solid construction, separates the crates from each other and serves to limit contact between the pigs to retard the spread of contagious diseases and to promote the health and development of the litter. A center aisle 25 is disposed between the opposing rows of farrowing crates 20 for ready access thereto.

As illustrated in FIGS. 1, 5 and 9, the farrowing crates 20 are positioned in opposing rows of the gang slats with the number of farrowing crates corresponding to the number of gang slats. Thus, each gang slat 10 supports a single farrowing crate, and comprises a central section 31 and opposing side sections 32 formed integrally therewith and extending along opposite sides of the central section. The central section 31 is adapted to support the sow in the central pen 21 of the associated farrowing crate. Similarly, the opposing side sections 32 are adapted to support the litter in the side pens 22 of the associated farrowing crate 20. Typically, the gang slat 10 has an overall size of five feet in width and about ten feet in length.

The overall size of the farrowing crate is substantially the same as a gang slat. Further, the central pen 21 of the farrowing crate overlies only the central section 31 of the gang slat, and the side pens 22 of the farrowing crate overlie only the side sections 32 of the gang slat. As shown by the broken lines A in FIG. 1, which is a projection of the dividers 23 on the gang slat 10, the dividers thereby not only separate the central and side pens 21 and 22, respectively, but also serve to define the central section 31 and side sections 32 of the gang slat.

For facilitating removal of the waste from the litter of pigs and the sow's waste, a plurality of longitudinally extending slots 33 and 34 are provided in respective front and rear halves of the central section 31 of the gang slat. In the illustrated gang slat 10, the slots 33 of the central section 31 are positioned in the front half thereof adjacent the center aisle 25 in the farrowing house, and are typically ⅜ inches wide for disposing of waste from the litter of pigs, with the slots 34 at the other end or rear half of the central section typically being one inch wide to dispose of the sow's waste. The sow is positioned within the central pen 21 so that the wider slots 34 in the rear half are positioned underneath rear portions of her body for readily receiving the deposited waste therethrough into pit 15 therebelow. The side sections 32 of the gang slat also have a plurality of longitudinally extending slots 35 for passage of the waste from the litter of pigs through the gang slat to the pit 15 therebelow. These slots 35 are typically ⅜ inch wide.

To provide a surface on which the newborn pigs and sow can comfortably lie, the gang slat 10 is also provided with a solid center section 36 between the slots 33 and 35 adjacent the center aisle 25 and the slots 34 and 35 at the other end of the central section 31. In a second embodiment illustrated in FIG. 3, the gang slot 10' has a much narrower solid center section 36'. Thus, longer slots 33'-35' are included, and removal of waste to the pit 15 below is facilitated. The remaining elements of the second embodiment of the invention shown in FIG. 3 are identical to corresponding elements shown in FIG. 2 and therefore bear the same reference characters with the prime notation added.

As indicated earlier, the gang slat 10 is integrally formed from reinforced concrete. Thus, central section 31 and side sections 32 of the gang slat are integrally formed with each other. To provide the desired structural strength to the gang slat 10, reinforcing rods 37 are arranged in upper and lower networks and embedded within the gang slat 10, as best shown in FIGS. 7 and 8. Predominantly, the reinforcing rods 37 extend longitudinally of the gang slat and within the slat portions thereof between slots 33, 34 and 35. Reinforcing rods, not shown, are also conventionally positioned transversely within the ends of the gang slat and across the solid center section 36, all for the purpose of providing further strength to the gang slat.

The gang slat 10 further comprises an end section 41 which defines one end of the gang slat and is integrally formed with the central section 31 and side sections 32 and extends along one end of such sections and is adapted to be positioned entirely exterior to the farrowing crate 20. Thus, this end section 41 serves for defining a side aisle floor in the farrowing house for passage to and from the associated farrowing crate.

Associated with each of the gang slats 10 is means for circulation of a heated fluid and a coolant therethrough, which aids in maintaining surfaces of the side sections 32 in a warm condition conducive to promoting a healthy litter of newborn pigs and which concurrently aids in maintaining surfaces of the central sections 31 in a cool condition conducive to the health of the sow. In this manner, heat is radiated toward the litter or conducted to the litter when the pigs are in contact with surfaces of the side sections 32, and the sow is cooled when she is in contact with the central section 31. The means for circulation of the heated fluid and coolant comprises conduit means embedded within the opposing side sections 32 and within the central sections 31 of the gang slats, and includes respective runs of conduit 42 and 43 extending longitudinally throughout the length of the side sections and sections of conduit 44 within the central sections 31. Some of the slots 35 are positioned between the runs of conduit 42 and 43 and the central section 31 of the gang slat 10 whereby conduction of heat from the runs of conduit to the central section is minimized and so that the side sections 32 are not cooled by conduction from the sections of conduit. Furthermore, as best shown in FIG. 7, the upper and lower networks of reinforcing rods 37 are respectively positioned above and below the embedded runs of conduit 42 and 43 and sections of conduit 44 so as not to obstruct the runs or sections of conduit while strengthening the gang slat 10.

Means interconnect corresponding ends of the runs of conduit 42 and 43 in the opposing side sections 32 so that heated fluid flows throughout one run of conduit, into and through the other run of conduit. For this purpose, the embodiment illustrated in FIGS. 1, 2 and 9 includes sections of conduit 45 embedded within the end section 41 of the gang slat and interconnecting the runs of conduit 42 and 43 embedded within the opposing side sections 32 of the gang slat. Thus, heated fluid may flow from the run of conduit in one of the side sections 32 to the run of conduit in the other opposing side section without passing through the central section 31. In this manner, applying heat to the sow is avoided.

The other ends of the runs of conduit 42 and 43 in the opposing side sections 32 are defined by female connections 46 which are accessible at the end of the gang slat for connection in a desired manner. Thus, as shown in FIGS. 1 and 7, the female connections 46 are shown with a larger diameter than the remainder of the runs of conduit 42 and 43. Conduit sections 47 are connected to the female connections 46 to interconnect the runs of conduit 42 and 43 in each gang slat to runs of conduit in other adjacent gang slats.

As best shown in FIG. 9, for connecting the runs of conduit 42 and 43 in the gang slats on one side of the aisle with the conduits in the gang slats on the other side of the aisle, a conduit section 50 is provided which spans across the far end of the center aisle 25. For connecting the conduits in the respective opposing rows of gang slats to fluid flow components, such as heat exchanger means 51, pump 52, and valve means 53, other conduit sections 54 are provided which, as illustrated in FIG. 9, are embedded within the center aisle and extend from and to the aforementioned associated fluid flow components.

Heat exchanger means 51, typically comprising a conventional hot water heater, is connected to the runs of conduit 42 and 43 and is adapted to supply heated fluid for circulation through the runs of conduit. There is also provided means for transmitting heated fluid to the runs of conduit 42 and 43 and for returning heated fluid to the heat exchanger means 51 after dissipation of heat from the fluid. The means for transmitting and returning heated fluid includes a conventional water pump 52 connected to the heat exchanger means 51. Valve means 53 is also included and connected to the heat exchanger means 51 and pump 52 for controlling the rate at which heated fluid is circulated through the runs of conduit 42 and 43, and thereby, the temperature to which surfaces of the side sections 32 are heated.

The sections of conduit 44 embedded within the central sections 31 are also interconnected to define a circulation system for coolant to flow through the gang slats 10. Thus, conduit sections 55 interconnect the sections of conduit 44 embedded within the central sections 31, and another conduit section 56 connects the sections of conduit 44 in the gang slats on one side of the aisle to the sections of conduit on the other side of the aisle. Fluid flow components, such as a heat exchanger means 57, pump 58, and valve means 59, are connected to the sections of conduit 44 in the respective opposing rows of gang slats by conduit sections 60 as shown in FIG. 9.

Heat exchanger means 57 typically comprises a conventional water refrigeration unit and is connected to the sections of conduit 44 embedded within the central sections 31 to supply coolant for circulation therethrough. The pump 58, also a conventional water pump, is connected to the heat exchanger means 57, and valve means 59 also connected to the pump 58 and heat exchanger means 57 controls the rate at which the coolant is circulated. Thus, the temperature of surfaces of the central sections 31 is controlled by the pump 58 and valve means 59 to provide a cool temperature for the sow.

During construction of the farrowing house 12, the center aisle 25 is formed from poured concrete after the gang slats 10 are in place on the peripheral walls 13 and center walls 14 and after the runs of conduit 42 and 43 and the sections of conduit 44 are connected. In this manner, the sections of conduit 47, 50, 54, 55, 56 and 60 are embedded within the concrete forming the center aisle 25 and do not obstruct passage to and from the farrowing crates 20.

A third embodiment of the gang slat is illustrated in FIGS. 4 and 10 and is indicated generally at 61. This gang slat 61 basically differs over the gang slat 10 in that the same is of shorter length and does not have an end section defining said aisles of the farrowing house, as in the first embodiment. Instead, a farrowing house constructed with this gang slat 61, would typically have the side aisles formed of poured concrete in a similar manner of construction as the poured center aisle and as shown in FIG. 6.

As in gang slat 10, gang slat 61 has conduit means embedded within the opposing side sections 62 and extending longitudinally throughout the length of the side sections which correspond to the overall length of the gang slat. As illustrated, the conduit means comprises respective runs of conduit 63 and 64 with female connections 65 and 66 defining opposite ends of the runs. Such female connections 65 and 66 correspond with the female connections 45 as in the first form of the invention and are readily accessible at opposite ends of the gang slat 61 for connection in a desired manner.

While the runs of conduit 63 and 64 may be connected in a similar manner as in the first form of the invention for flow of heated fluid therethrough, alternatively as illustrated in FIG. 10, the corresponding runs in each gang slat are interconnected with each other in such a manner as to define first and second circulation systems for heated fluid to flow through the gang slats. Thus, as illustrated in FIG. 10, corresponding runs of conduit 63 in each gang slat are interconnected with each other by conduit sections 71 to define a first circulation system. The corresponding runs of conduit 64 in each gang slat are interconnected by conduit sections 72 for defining a second circulation system for the flow of heated fluid through the gang slats.

By the provision of first and second circulation systems, the heating system can be operated to conserve hot water. Heat exchanger means 73 connected to the runs of conduit 63 and 64 is adapted to supply heated fluid for circulation through the runs of conduit of both circulation systems, and a pump 74 is also included for transmitting heated fluid to the runs of conduit and for returning heated fluid to the heat exchanger means 73 after dissipation of heat therefrom. There is also provided, however, valve means 75 associated with the first and second circulation systems for selective operation of one or both circulation systems. Thus, surfaces of corresponding side sections 62 on either side of the central sections 76 or surfaces of all side sections can be maintained in a warm condition. In this manner, the temperature required for development of the litter can be maintained.

In the drawings and specification, there has been set forth preferred embodiments of the invention and although specific terms are employed, they are used in a generic and descriptive sense only and not for purposes of limitation.

That which is claimed is:

1. In an animal shelter for newborn pigs, wherein there is provided a plurality of farrowing crates arranged in opposing rows, each farrowing crate having a central pen for confining a sow therein and side pens extending along opposite sides of the central pen for confining a newborn litter of pigs in close proximity to the sow, and wherein there is further provided a center aisle disposed between said opposing rows for access to said farrowing crates, the combination therewith of
   a plurality of slotted floor sections, commonly referred to as gang slats, arranged in corresponding rows to underlie and support said farrowing crates, each gang slat being formed from reinforced concrete and comprising
      a central section underlying the central pen of one of said farrowing crates and adapted to support the sow in said central pen and having a plurality of slots therein for passage of the sow's waste therethrough; and
      opposing side sections formed integrally with said central section and extending along opposite sides of said central section, said side sections underlying the side pens of said farrowing crate and being adapted to support the litter in said side pens and having a plurality of slots therein for passage therethrough of the waste from the litter of newborn pigs;
   means associated with each of said gang slats for circulation of a heated fluid and a coolant therethrough, so as to aid in maintaining surfaces of said opposing side sections in a warm condition conducive to promoting a healthy litter of newborn pigs and so as to concurrently aid in maintaining surfaces of said central sections in a cool condition conducive to the health of the sow, said means comprising
      conduit means embedded within said opposing side sections of said gang slats and within said central sections of said gang slats;
      heat exchanger means for supplying heated fluid for circulation through only said conduit means embedded within said opposing side sections and for supplying coolant for circulation through only said conduit means embedded within said central section; and
      means interposed between said heat exchanger means and said conduit means for respectively circulating heated fluid to said conduit means embedded within said opposing side sections and for returning heated fluid to said heat exchanger means after dissipation of heat therefrom and for circulating coolant to said conduit means embedded within said central sections and for returning coolant to said heat exchanger means.

2. In the combination as defined in claim 1 wherein each said gang slat further comprises
   an end section also formed from reinforced concrete and integrally with said central and side sections, said end section being positioned adjacent said central and side sections and defining one end of said gang slat and adapted to be positioned entirely exteriorly of the associated farrowing crate for serving as a side aisle floor; and
   conduit means embedded within said end section of the gang slat and interconnecting said conduit means embedded within said opposing side sections of said gang slat so that heated fluid may flow from said conduit means in one said side section to said conduit means in the opposing side section without passing through said central section to thus avoid applying heat to the sow.

3. In the combination as defined in claim 1 wherein said conduit means embedded within said opposing side sections and said conduit means embedded within said central section of each gang slat include female connections accessibly positioned along the ends of the gang slats and defining conduit entrance and exit ends embedded within said side sections and said central section for facilitating interconnection of said conduit means.

4. In the combination as defined in claim 1 wherein said conduit means embedded within said opposing side sections of each said gang slat include respective runs of conduit extending longitudinally throughout the overall length of said side sections.

5. In the combination as defined in claim 4 wherein means interconnect corresponding ends of said respective runs of conduit in said opposing side sections so that heated fluid flows through and from one respective run of conduit, into and through another run of conduit.

6. In the combination as defined in claim 4 wherein slots for passage of animal waste therethrough extend longitudinally in the direction of the length of said side sections with at least some of said slots being positioned between said runs of conduit embedded within said opposing side sections and said central section whereby conduction of heat from said runs of conduit to said central section is minimized.

7. In the combination as defined in claim 4 wherein said respective runs of conduit embedded within said opposing side sections of said gang slat extend longitudinally throughout the overall length of said gang slat with opposite ends of said runs of conduit being accessible at the opposite ends of the gang slat for connection in a desired manner.

8. In the combination as defined in claim 7 including conduit means interconnecting a run of conduit in each gang slat to a run of conduit in each of the other gang slats and defining a first circulation systemm for the heated fluid to flow through the gang slats, conduit means interconnecting another run of conduit in each gang slat to another run of conduit in each of the other gang slats and defining a second circulation system for the heated fluid to flow through the gang slat, and valve means associated with said first and second circulation systems for selective operation of one or both circulation systems.

9. In the combination as defined in claim 8 wherein the interconnected runs of conduit defining the first circulation system are correspondingly located in the gang slats and wherein the interconnected runs of conduit defining the second circulation system are also correspondingly located in the gang slats.

10. In the combination as defined in claim 1 wherein said conduit means embedded within said central section of each said gang slat includes a section of conduit with the ends of said section of conduit being accessible at one end of the gang slat for connection in a desired manner.

11. In the combination as defined in claim 10 including conduit means interconnecting a section of conduit in each central section to a section of conduit in each of the other central sections and defining a circulation system for coolant to flow through the gang slats.

12. In the combination as defined in claim 10 wherein slots for passage of animal waste therethrough extend longitudinally in the direction of the length of said side sections with at least some of said slots being positioned between said section of conduit embedded within said central section and said opposing side sections whereby cooling of the side sections by conduction from coolant within said section of conduit is minimized.

13. In the combination as defined in claim 1 wherein each gang slat includes upper and lower networks of reinforcing rods embedded within said gang slat and being respectively positioned above and below said embedded conduit means within said side sections and within said central section so that said gang slats are strengthened by said networks so as to support substantial weight from the farrowing crate, the sow, and the litter.

14. In an animal shelter for newborn pigs, wherein there is provided a plurality of farrowing crates arranged in opposing rows, each farrowing crate having a central penn for confining a sow therein and side pens extending along opposite sides of the central pen for confining a newborn litter of pigs in close proximity to the sow, and wherein there is further provided a center aisle disposed between said opposing rows for access to said farrowing crates, the combination therewith of
  a plurality of slotted floor sections, commonly referred to as gang slats, arranged in corresponding rows to underlie and support said farrowing crates, each gang slat being formed from reinforced concrete and comprising
    a central section underlying the central pen of one of said farrowing crates and adapted to support the sow in said central pen and having a plurality of slots therein for passage of the sow's waste therethrough; and
    opposing side sections formed integrally with said central section and extending along opposite sides of said central section, said side sections underlying the side pens of said farrowing crate and being adapted to support the litter in said side pens and having a plurality of slots therein for passage therethrough of the waste from the litter of newborn pigs;
  means associated with each of said gang slats for circulation of a heated fluid and a coolant therethrough, so as to aid in maintaining surfaces of said opposing side sections in a warm condition conducive to promoting a healthy litter of newborn pigs and so as to concurrently aid in maintaining surfaces of said central sections in a cool condition conducive to the health of the sow, said means comprising
    first and second runs of conduit respectively embedded within only respective side sections of each gang slat and extending longitudinally throughout the length of the side sections, each run of conduit having opposing ends accessibly positioned at opposite ends of the respective side section,
    means interconnecting said first runs of conduit and defining a first circulation system for heated fluid to flow through corresponding side sections;
    means interconnecting said second runs of conduit and defining a second circulation system for the heated fluid to flow through corresponding opposing side sections;
    a section of conduit embedded within only said central section of each said gang slat and having inlet and outlet ends accessibly positioned at one end of the associated central section;
    means interconnecting each said section of conduit in each central section to a section of conduit in each of the other central sections and defining a circulation system for coolant to flow through the gang slats;
    heat exchanger means for supplying heated fluid for circulation through said runs of conduit and for supplying coolant for circulation through said sections of conduit;
    means interposed between said heat exchanger means and said conduit for respectively circulating heated fluid to said runs of conduit and for returning heated fluid to said heat exchanger means after dissipation of heat therefrom and for transmitting coolant to said sections of conduit and for returning coolant to said heat exchanger means; and
    valve means associated with said first and second circulation systems for heated fluid for selective operation of one or both circulation systems for heated fluid.

15. An integral slotted floor section, commonly referred to as a gang slat, adapted to underlie and support a farrowing crate having a central pen for confining a sow therein and side pens extending along opposite sides of the central pen for confining a newborn litter of pigs in close proximity to the sow, and comprising
  a central section formed from reinforced concrete and adapted to support the sow in the central pen, said central section having a plurality of slots therein for passage of the sow's waste therethrough;

opposing side sections also formed from reinforced concrete and integrally with said central section, said side sections extending along opposite sides of said central section and being adapted to support the litter in the side pens, said side sections also having a plurality of slots therein for passage therethrough of the waste from the litter of pigs;

conduit means embedded within only said central section of the gang slat for circulation of a coolant therethrough so as to aid in maintaining surfaces of said central section in a cool condition conducive to the health of the sow while thus avoiding cooling the litter of pigs; and conduit means embedded within only said side sections of the gang slat for circulation of a heated fluid therethrough so as to aid in maintaining surfaces of said sections in a warm condition conducive to promoting a healthy litter of pigs while thus avoiding applying heat to the sow.

16. The gang slat as defined in claim 15 wherein slots for passage of animal waste therethrough extend longitudinally in the direction of the length of said side sections with at least some of said slots being positioned between said conduit means embedded within said side sections and said central section whereby conduction of heat to said central section is minimized and said side sections are not cooled by conduction from said conduit means within said central section.

17. The gang slat as defined in claim 15 wherein said conduit means embedded within said side sections and said central section include female connections along the same end of the gang slat and defining conduit entrance and exit ends embedded within the side sections and central section for facilitating connection in a desired manner.

18. The gang slat as defined in claim 15 wherein said conduit means embedded within the side sections of the gang slat include female connections along opposite ends of the gang slat and defining conduit entrance and exit ends embedded within the side sections for facilitating connection in a desired manner.

19. An integral slotted floor section, commonly referred to as a gang slat, adapted to underlie and support a farrowing crate having a central pen for confining a sow therein and side pens extending along opposite sides of the central pen for confining a newborn litter of pigs in close proximity to the sow, and comprising a central section formed from reinforced concrete and adapted to support the sow in the central pen, said central section having a plurality of slots therein for passage of the sow's waste therethrough;

opposing side sections also formed from reinforced concrete and integrally with said central section, said side sections extending along opposite sides of said central section and being adapted to support the litter in the side pens, said side sections also having a plurality of slots therein for passage therethrough of the waste from the litter of pigs;

an end section also formed from reinforced concrete and integrally with said central and side sections, said end section being positioned adjacent said central and side sections and defining one end of said gang slat and adapted to be positioned entirely exterior to the associated farrowing crate for serving as a side aisle floor;

conduit means embedded within only said central section of the gang slat for circulation of a coolant therethrough so as to aid in maintaining surfaces of said central section in a cool condition conducive to the health of the sow while thus avoiding cooling the litter of pigs; and conduit means embedded within only said side sections and said end section of the gang slat for circulation of a heated fluid therethrough so as to aid in maintaining surfaces of said side sections in a warm condition conducive to promoting a healthy litter of pigs while thus avoiding applying heat to the sow.

20. An integral slotted floor section, commonly referred to as a gang slat, adapted to underlie and support a farrowing crate having a central pen for confining a sow therein and side pens extending along opposite sides of the central pen for confining a newborn litter of pigs in close proximity to the sow, and comprising a central section formed from reinforced concrete and adapted to support the sow in the central pen, said central section having a plurality of slots therein for passage of the sow's waste therethrough;

opposing side sections also formed from reinforced concrete and integrally with said central section, said side sections extending along opposite sides of said central section and being adapted to support the litter in the side pans, said side sections also having a plurality of slots therein for passage therethrough of the waste from the litter of pigs;

an end section also formed from reinforced concrete and integrally with said central and side sections, said end section being positioned adjacent said central and side sections and defining one end of said gang slat and adapted to be positioned entirely exterior to the associated farrowing crate for serving as a side aisle floor;

conduit means embedded within only said central section of the gang slat for circulation of a coolant therethrough so as to aid in maintaining surfaces of said central section in a cool condition conducive to the health of the sow while thus avoiding cooling the litter of pigs; and conduit means embedded within only said side sections of the gang slat and extending longitudinally throughout the overall length of the gang slat with opposing ends of said conduit means being accessible at the opposite ends of the gang slat for connection in a desired manner whereby heated fluid can be circulated through the gang slat so as to aid in maintaining surfaces of said side sections in a warm condition conducive to promoting a healthy litter of pigs while thus avoiding applying heat to the sow.

21. In an animal shelter for newborn pigs, wherein there is provided a plurality of farrowing crates arranged in opposing rows, each farrowing crate having a central pen for confining a sow therein and side pens extending along opposite sides of the central pen for confining a newborn litter of pigs in close proximity to the sow, and wherein there is further provided a center aisle disposed between said opposing rows for access to said farrowing crates, the combination therewith of a plurality of slotted floor sections, commonly referred to as gang slats, arranged in corresponding rows to underlie and support said farrowing crates, each gang slat being formed of reinforced concrete and comprising a central section underlying the central pen of one of said farrowing crates and adapted to support the sow in said central pen and having a plurality of slots in the front half portion thereof for disposing of waste from the litter of pigs and a plurality of slots in the rear half portion for passage of the sow's waste therethrough; and opposing side sections formed integrally with said central section and extending along opposite sides of said central section, said side sections underlying the side pens of said farrowing crate and being adapted to support the litter in said side pens and having a plurality of slots therein for passage therethrough of the waste from the litter of newborn pigs;

means associated with each of said gang slats for circulation of a coolant therethrough so as to aid in maintaining surfaces of said central sections in a cool condition conducive to the health of the sow and while avoiding cooling the litter, said means comprising conduit means embedded within only said front half portions of said central sections of said gang slats and having entrance and exit ends positioned at the front ends of the gang slats;

heat exchanger means for supplying coolant for circulation through said conduit means; and means interposed between said heat exchanger means and said conduit means for circulating coolant to said conduit means and for returning coolant to said heat exchanger means.

22. In the combination as defined in claim 21 wherein said conduit means embedded within the front half portion of each gang slat includes female connections accessibly positioned along the front end of the gang slat and defining said conduit entrance and exit ends and being embedded within the front half of the central section for facilitating interconnection of said conduit means.

23. The gang slat as defined in claim 21 further including upper and lower networks of reinforcing rods embedded within the gang slat and being respectively positioned above and below said embedded conduit means so that the gang slats are strengthened by said networks so as to support substantial weight from the farrowing crate, the sow, and the litter.

24. In the combination as defined in claim 21 wherein said conduit means embedded within the front half portion of said central section of each gang slat includes a section of conduit with the ends of said section of conduit being accessible at the front end of the gang slat for connection in a desired manner.

25. In the combination as defined in claim 24 including conduit means interconnecting said sections of conduit in said central sections and defining a circulation system for coolant to flow through the gang slat.

26. An integral slotted floor section, commonly referred to as a gang slat, adapted to underlie and support a farrowing crate having a central pen for confining a sow therein and side pens extending along opposite sides of the central pen for confining a newborn litter of pigs in close proximity to the sow, and comprising a central section formed from reinforced concrete and adapted to support the sow in the central pen, said central section having a plurality of slots in the front half portion thereof for disposing of waste from the litter of pigs and a plurality of slots in the rear half portion for passage of the sow's waste therethrough;

opposing said sections also formed from reinforced concrete and integrally with said central section, said side sections extending along opposite sides of said central section and being adapted to support the litter in the side pens, said side sections also having a plurality of slots therein for passage therethrough of the waste from the litter of pigs; and conduit means embedded within only said front half portion of said central section of the gang slat for circulation of a coolant therethrough so as to aid in maintaining surfaces of said central section in a cool condition conducive to the health of the sow while thus avoiding cooling the litter of pigs said conduit means having entrance and exit ends positioned at the front end of the gang slat.

27. In an animal shelter for newborn pigs, wherein there is provided a plurality of farrowing crates arranged in opposing rows, each farrowing crate having a central pen for confining a sow therein and side pens extending along opposite sides of the central pen for confining a newborn litter of pigs in close proximity to the sow, and wherein there is further provided a center aisle disposed between said opposing rows for access to said farrowing crates, the combination therewith of a plurality of slotted floor sections, commonly referred to as gang slats, arranged in corresponding rows to underlie and support said farrowing crates, each gang slat being formed from reinforced concrete and comprising a central section underlying the central pen of one of said farrowing crates and adapted to support the sow in said central pen and having a plurality of slots in the front half portion thereof for disposing of waste from the litter of pigs and a plurality of slots in the rear half portion for passage of the sow's waste therethrough; and opposing side sections formed integrally with said central section and extending along opposite sides of said central section, said side sections underlying the side pens of said farrowing crate and being adapted to support the litter in said side pens and having a plurality of slots therein for passage therethrough of the waste from the litter of newborn pigs;

means associated with each of said gang slats for circulation of a heated fluid and a coolant therethrough, so as to aid in maintaining surfaces of said opposing side sections in a warm condition conducive to promoting a healthy litter of newborn pigs and so as to concurrently aid in maintaining surfaces of said central sections in a cool condition conducive to the health of the sow, said means comprising first said second runs of conduit respectively embedded within only respective side sections of each gang slat and extending longitudinally throughout the length of the side sections, each run of conduit having opposing ends accessibly positioned at opposite ends of the respective side section, means interconnecting said first runs of conduit and defining a first circulation system for heated fluid to flow through corresponding side sections;

means interconnecting said second runs of conduit and defining a second circulation system for the heated fluid to flow through corresponding opposing side sections;

a section of conduit embedded within only the front half of said central section of each said gang slat and having inlet and outlet ends accessibly positioned at the front end of the associated central section;

means interconnecting each said section of conduit in each central section to a section of conduit in each of the other central sections and defining a circulation system for coolant to flow through the gang slats;

heat exchanger means for supplying heated fluid for circulation through said runs of conduit and for supplying coolant for circulation through said sections of conduit;

means interposed between said heat exchanger means and said conduit for respectively circulating heated fluid to said runs of conduit and for returning heated fluid to said heat exchanger means after dissipation of heat therefrom and for transmitting coolant to said sections of conduit and for returning coolant to said heat exchanger means; and valve means associated with said first and second circulation systems for heated fluid for selective operation of one or both circulation systems for heated fluid.

28. An integral slotted floor section, commonly referred to as a gang slat, adapted to underlie and support a farrowing crate having a central pen for confining a sow therein and side pens extending along opposite sides of the central pen for confining a newborn litter of pigs in close proximity to the sow, and comprising a central section formed from reinforced concrete and adapted to support the sow in the central pen, said central section having a plurality of slots in the front half portion thereof for disposing of waste from the litter of pigs and a plurality of slots in the rear half portion for passage of the sow's waste therethrough;

opposing side sections also formed from reinforced concrete and integrally with said central section, said side sections extending along opposite sides of said central section and being adapted to support the litter in the side pens, said side sections also having a plurality of slots therein for passage therethrough of the waste from the litter of pigs;

conduit means embedded within only the front half portion of said central section of the gang slat for circulation of a coolant therethrough so as to aid in maintaining surfaces of said central section in a cool condition conducive to the health of the sow while thus avoiding cooling the litter of pigs; and conduit means embedded within only said side sections of the gang slat for circulation of a heated fluid therethrough so as to aid in maintaining surfaces of said sections in a warm condition conducive to promoting a healthy litter of pigs while thus avoiding applying heat to the sow.

* * * * *

UNITED STATES PATENT AND TRADEMARK OFFICE
CERTIFICATE OF CORRECTION

PATENT NO. : 4,252,082

DATED : February 24, 1981

INVENTOR(S) : William T. Herring

It is certified that error appears in the above-identified patent and that said Letters Patent are hereby corrected as shown below:

Column 2, Line 28, "or" should be --of--; Line 51, "to" should be --the--.

Column 3, Line 28, after "sow" insert --so--.

Column 4, Line 7, "crate" should be --crates--.

Column 6, Line 40, "slot" should be --slat--.

Column 11, CLAIM 8, Line 9, "systemm" should be --system--; same column, CLAIM 14, Line 55, "penn" should be --pen--.

Column 14, CLAIM 20, Line 29, "pans" should be --pens--.

Column 16, CLAIM 26, Line 4, "said" should be --side--; same column, CLAIM 27, Line 57, "said" should be --and--.

Signed and Sealed this

Twenty-sixth Day of May 1981

[SEAL]

Attest:

Attesting Officer

RENE D. TEGTMEYER

Acting Commissioner of Patents and Trademarks